US008953217B2

(12) United States Patent
Schmidt et al.

(10) Patent No.: US 8,953,217 B2
(45) Date of Patent: Feb. 10, 2015

(54) DEVICE AND METHOD FOR PRINTING A WRAPPER STRIP

(75) Inventors: Alfred Schmidt, Munich (DE); Frank Werner, Munich (DE); Horst Breitenfeld, Kralling (DE); Thomas Hildebrandt, Pliening (DE)

(73) Assignee: Giesecke & Devrient GmbH, Munich (DE)

( * ) Notice: Subject to any disclaimer, the term of this patent is extended or adjusted under 35 U.S.C. 154(b) by 792 days.

(21) Appl. No.: 13/125,370

(22) PCT Filed: Oct. 20, 2009

(86) PCT No.: PCT/EP2009/007514

§ 371 (c)(1),
(2), (4) Date: Apr. 21, 2011

(87) PCT Pub. No.: WO2010/046091

PCT Pub. Date: Apr. 29, 2010

(65) Prior Publication Data

US 2011/0211202 A1 Sep. 1, 2011

(30) Foreign Application Priority Data

Oct. 21, 2008 (DE) ........................ 10 2008 052 421

(51) Int. Cl.

| | |
|---|---|
| ***G06K 15/10*** | (2006.01) |
| ***G06K 15/02*** | (2006.01) |
| ***B41J 2/30*** | (2006.01) |
| ***B65B 27/08*** | (2006.01) |
| ***B65B 61/02*** | (2006.01) |

(52) U.S. Cl.

CPC . *B41J 2/30* (2013.01); *B65B 27/08* (2013.01); *B65B 61/025* (2013.01)

USPC .......................................... 358/1.8; 358/1.12

(58) Field of Classification Search

None

See application file for complete search history.

(56) References Cited

U.S. PATENT DOCUMENTS

| | | | | |
|---|---|---|---|---|
| 4,396,304 | A | 8/1983 | Davenport et al. | |
| 4,637,742 | A * | 1/1987 | Sakai | 400/124.02 |
| 4,963,894 | A * | 10/1990 | Lebeau et al. | 347/237 |
| 5,099,383 | A | 3/1992 | Fukano et al. | |
| 5,111,218 | A * | 5/1992 | Lebeau et al. | 347/240 |
| 5,435,656 | A | 7/1995 | Gugel et al. | |
| 5,738,009 | A * | 4/1998 | Desie et al. | 101/129 |

(Continued)

FOREIGN PATENT DOCUMENTS

| | | |
|---|---|---|
| DE | 2835308 | 2/1980 |
| DE | 69115598 | 12/1995 |

(Continued)

OTHER PUBLICATIONS

International Search Report in PCT/EP2009/007514, Dec. 21, 2009.

(Continued)

*Primary Examiner* — Marcus T Riley

(74) *Attorney, Agent, or Firm* — Workman Nydegger

(57) ABSTRACT

An apparatus for printing a banding strip for documents of value, which is preferably moved relative to the apparatus, having a print head by means of which, upon an activation, more than nine dots can be printed, a circuit actuatable by print signals, which, in response to print signals, activates the print head in accordance with the print signals, in order to print patterns specified by the print signals, and a current supply unit for providing current for the circuit and by means thereof for the print head.

29 Claims, 5 Drawing Sheets

(56) References Cited

U.S. PATENT DOCUMENTS

Figure 1:
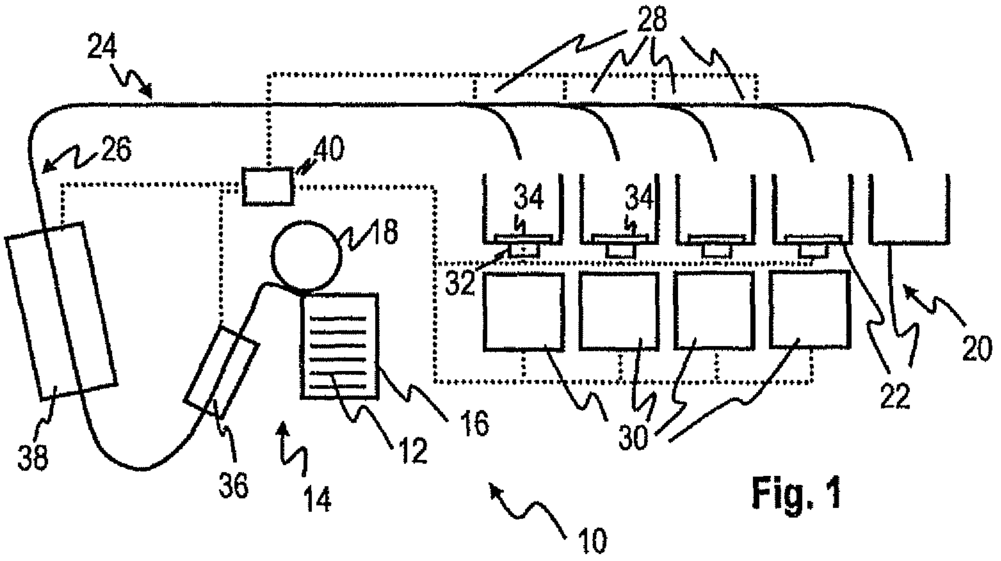

| | | | | | |
|---|---|---|---|---|---|
| 5,870,535 | A * | 2/1999 | Duffin et al. | 358/1.16 |
| 6,058,222 | A * | 5/2000 | Hashimoto | 382/300 |
| 6,097,109 | A | 8/2000 | Fendt et al. | |
| 6,151,099 | A * | 11/2000 | Okamura et al. | 355/47 |
| 6,195,674 | B1 * | 2/2001 | Elbourne et al. | 708/402 |
| 6,611,347 | B1 * | 8/2003 | Okada et al. | 358/1.15 |
| 6,832,825 | B1 * | 12/2004 | Nishikori et al. | 347/19 |
| 7,422,306 | B2 * | 9/2008 | Tatsumi et al. | 347/19 |
| 7,604,333 | B2 * | 10/2009 | Horsnell et al. | 347/85 |
| 2001/0021971 | A1 * | 9/2001 | Gibson et al. | 712/215 |
| 2003/0226455 | A1 | 12/2003 | Dopfer et al. | |
| 2004/0135878 | A1 * | 7/2004 | Mizes et al. | 347/240 |
| 2006/0238587 | A1 * | 10/2006 | Horsnell et al. | 347/100 |

FOREIGN PATENT DOCUMENTS

| | | |
|---|---|---|
| DE | 19746546 | 3/1999 |
| DE | 10225705 | 12/2003 |
| EP | 0418433 | 9/1989 |
| EP | 0380352 | 8/1990 |
| EP | 0472407 | 12/1995 |
| EP | 0299267 | 1/1998 |
| JP | 5836468 | 8/1981 |

OTHER PUBLICATIONS

Seiko, Seiko Precision; URL: http://www.seiko-precision.de/data/cms/printheads/fcmsv4457d8ff665335/files/Datasheet_SEIKO_PrintHead.pdf, gekennzeichnet 2006, abgerufen am Aug. 19, 2008, Zeile Frequency.

Search Report in corresponding German Application No. 10 2008 052 421.2; Sep. 2, 2009.

* cited by examiner

DEVICE AND METHOD FOR PRINTING A WRAPPER STRIP

The present invention relates to an apparatus for printing a banding strip, in particular a banding strip for documents of value, a method for printing a banding strip, in particular a banding strip for documents of value, and a bank note processing apparatus having a band printing apparatus.

In this context, documents of value refer to sheet-shaped objects, which represent for example a monetary value or an authorization and thus shall not be producible at will by unauthorized persons. Therefore, they have features not easy to manufacture, in particular to copy, whose presence is an indication of the authenticity, i.e. the manufacturing by a body authorized thereto. Important examples of such documents of value are coupons, vouchers, checks and in particular bank notes.

Documents of value, in particular bank notes, often are arranged, for a simpler handling, in stacks which are banded, i.e. strapped with a band, in order to prevent the disintegration of the stack. Here and in the following, a band refers to a strip of any flexible material, in particular paper or plastic foil, whose width can in particular be smaller than the length of the documents of value, i.e. their extension along the longer edge of the documents of value. However, a banding along the longitudinal direction of the documents of value of a stack is also conceivable. Upon the actual banding, the band can be given by a section of a banding strip wound up for example as a roll or coil, which forms the band after detachment from the wound-up banding strip upon the actual banding or strapping.

An important case of application for the banding of documents of value is the banding of stacks having a predetermined number of bank notes which were checked beforehand as to certain properties, for example their type or their denomination and their authenticity. For this purpose, there are used bank note processing apparatuses which check bank notes to be processed and, in dependence on the result of the check, stack the bank notes in one or more pockets or feed them to a destruction process. Stacked bank notes then are banded preferably by machine and automatically, when the number of bank notes in the stack has reached the predetermined number.

Examples of banding apparatuses are found in DE 28 35 308 A1 and DE 102 25 705 A1. In the banding apparatus of DE 102 25 705 A1 a stack of bank notes, after its formation, is strapped with a banding strip of a band roll, which is then cut off. The ends are then connected with each other, for example by welding. Whereas DE 28 35 308 A1 describes a banding apparatus which first puts a banding strip onto a stack deposit. On this banding strip there are stacked bank notes. After a predetermined number of bank notes has been reached, the banding strip for forming the band is cut off. The so formed free ends are then guided over the stack, put on top of each other and connected to each other, for example welded.

Before the banding, the bands are printed preferably by means of an apparatus for printing information on banding strips, i.e. letters or numbers which may relate to information about the processing of the bank notes, for example a name of the organization carrying out the processing, or the date of the processing, and/or the owner and/or the value of the stack to be banded. This printing is effected only immediately before the feeding or putting the banding strip to the actual banding. Instead of the band, there can also be printed the banding strip used to form the band. However, the printing process requires, depending on the information to be printed, a certain amount of time. Therefore, an increase of the processing speed of the bank notes in bank note processing apparatuses having such printing devices is hardly possible.

The present invention is therefore based on the object of providing means and devices for improving the banding strip printing as well as a corresponding apparatus for processing documents of value.

This object is achieved by an apparatus for printing a banding strip which is preferably moved relative to the apparatus, in particular a banding strip for documents of value, having a print head by means of which, upon an activation, there can be printed more than nine dots, preferably more than 20 dots, particularly preferably more than 24 dots, a circuit actuatable by print signals, which, in response to print signals, activates the print head in accordance with the print signals, in order to print patterns specified by the print signals, and a supply unit for providing current for the circuit and by means thereof for the print head.

The object is further achieved by a method for printing a banding strip, in particular for documents of value, in which a banding strip is preferably moved relative to a print head, print signals are generated for printing a predetermined pattern, and the print head is activated several times in succession, in dependence on the print signals, for printing the pattern, wherein upon each activation there can be printed more than nine dots, preferably more than 20 dots, particularly preferably more than 24 dots.

The supply unit is configured to provide current for the circuit and by means thereof for the print head. The circuit actuates the print head, using the current supplied to the circuit, so that the print head is activated. For the operation, the circuit may have in principle at least one further voltage or current input.

The statement that [upon—added by the Translator] each activation of the print head there can be printed more than a certain number of dots, for example nine thereof, is understood to mean in particular that upon printing on a medium that is stationary relative to the print head there can be printed more than nine dots. Preferably, the print head can be configured to print, upon an activation, depending on the print signal, a number of different dots, which is smaller than or equal to a number N of dots specified by the print head and greater than or equal to the certain number, for example nine.

The method and the apparatus by means of which the method can be carried out, can be used, due to the high resolution of the print, to preferably print graphic patterns as a pattern. For this, in the apparatus, the circuit can be configured in particular such that, in response to corresponding print signals, the patterns comprise graphic patterns. Graphic patterns here are understood to mean patterns which are not numbers or letters of the Latin alphabet, or merely a combination thereof, but have a different shape, in particular for example Asian, in particular Chinese, or Arabic characters as well as other symbols, or graphic logos. This has the advantage that onto the bands there can be printed more information and/or information adapted to the respective culture or national language. Particularly preferably, the graphic pattern may comprise a bar code.

Preferably, in the method the print head is activated with a frequency of more than 0.5 kHz, preferably more than 1 kHz. In the apparatus, for this purpose, the print head, the supply unit and the circuit can preferably be configured such that the print head can be activated with a frequency of more than 0.5 kHz, preferably more than 1 kHz. Such a printing speed has the advantage that the band printing can also be carried out in very fast-working bank note processing devices and in particular also with a fast transport of the banding strip, without the processing speed of the bank notes having to be reduced.

The resolution in the transport direction with which patterns can be printed, in the case of the movement of the banding strip may also depend, among other things, on the relative speed between banding strip and print head. To make possible a simple structure, the apparatus is preferably formed such that the print head is stationary, i.e. unmoved relative to the supply unit and the circuit, and the banding strip is moved. In the method preferably the banding strip is moved for printing, while the print head is held stationary.

As print heads there can be used any suitable print heads, in particular ink jet print heads. Preferably, however, dot matrix print heads are used, as with these there is no risk that dried ink may clog nozzles. Print heads of these types can have in particular a predetermined number of printing elements which each print a dot. An activation of the print head here is understood to mean in particular an actuation, upon which each of the printing elements is operated at a time or not in dependence on the print signal or pattern to be printed.

So as to be able to achieve a high printing speed, in the apparatus the print head may comprise in particular a pin print head which comprises a predetermined number of more than nine pins, preferably more than eighteen thereof, movable between a print position and a rest position and for each of the pins a respective coil for movement thereof from the rest position into the print position and a respective return element for movement thereof from the print position back into the rest position, wherein the circuit comprises the coil. The circuit may be adapted to apply, in dependence on a print signal, to coils specified by the print signal a first voltage generated by means of the supply unit, so that current is fed respectively to said coils for moving the corresponding pins into the print position, and to thereafter apply to the coils specified by the print signal a second voltage which is opposite to the first voltage. In the method, as a print head there can be used a pin print head which comprises a predetermined number of more than nine pins movable between a print position and a rest position and for each of the pins a respective coil for movement thereof from the rest position into the print position and a respective return element for movement thereof from the print position back into the rest position, and in which, for moving the pins, in dependence on the print signal, a first voltage is applied to coils specified by the print signal, so that current is fed respectively to said coils for moving the corresponding pins into the print position, and thereafter a second voltage is applied to the coils specified by the print signal, which is opposite to the first voltage. The second voltage, which is opposite to the first voltage, here is understood to mean a voltage of a sign different than the first voltage, but not necessarily of the same amount. Further, the voltage which is actually formed between the ends of the respective coils may be variable in time. By the change of the voltage, the current, which based on the magnetic field of the coils continues to flow through these after the turning off of the first voltage, can decay faster because it runs against the second voltage.

This design is generally advantageous for band printing. Object of the present invention is therefore also an apparatus for printing a banding strip, in particular a banding strip for documents of value, having a pin print head which comprises a predetermined number of pins movable between a print position and a rest position and for each of the pins a respective coil for movement thereof from the rest position into the print position and a respective return element for movement thereof from the print position back into the rest position, a supply unit for providing current for the coils or the actuation of the coils and having a circuit, actuatable by print signals, comprising the coils, which, in dependence on a print signal, applies to coils specified by the print signal a first voltage generated by means of the supply unit, so that current is fed respectively to said coils for moving the corresponding pins into the print position, and thereafter applies to the coils specified by the print signal a second voltage which is opposite to the first voltage.

Further object of the invention is, accordingly, a method for printing a banding strip, in particular for documents of value, wherein a banding strip is preferably moved relative to a print head, print signals are generated for printing a predetermined pattern, and a pin print head, which comprises a predetermined number of pins movable between a print position and a rest position and for each of the pins a respective coil for movement thereof from the rest position into the print position and a respective return element for movement thereof from the print position back into the rest position, prints, in response to the print signals, patterns onto the banding strip, wherein for moving the pins, in dependence on the print signal, a first voltage is applied to coils specified by the print signal, so that current is fed respectively to said coils for moving the corresponding pins into the print position, and thereafter a second voltage is applied to the coils specified by the print signal, which is opposite to the first voltage.

Here, too, as a pin print head there can preferably be used a pin print head in which the number of pins is greater than nine, preferably eighteen, and/or can be activated with a frequency of more than 0.5 kHz, preferably more than 1 kHz. For this, in the apparatus the number of pins can preferably be greater than nine, preferably eighteen, and/or the pin print head, the circuit and the supply unit can be configured to activate the print head with a frequency of more than 0.5 kHz, preferably more than 1 kHz. The use of a dot matrix printer with more than nine pins, preferably more than 20 pins, with the stated circuit permits not only the printing of alphanumeric characters but also graphic patterns with a high speed, in particular of more than 600 dots/s.

The printing elements, in particular the pins, in principle can be arbitrarily arranged, but preferably they are arranged, in the case of relative movement of print head and banding strip, along a preferably straight line, which extends not in parallel, preferably at an angle greater than 45°, particularly preferably of 90° to the direction of the relative movement in the area of the print head.

For moving the pins, significant currents are necessary for a short time. In the method, therefore, preferably for providing current for the movement of the pins into the print position, there is used charge from a rechargeable element, and current resulting from a movement of the pins from the print position into the rest position is used at least partially for charging the rechargeable element. In the band printing apparatus, for this, the circuit may have in parallel to its input, which is connected with the supply unit, at least one rechargeable element, preferably a capacitor, which upon applied first voltage is at least partially discharged in order to feed current to the coils, and upon applied second voltage is at least partially charged by the current which is generated upon the movement of pins moved into the print position back into the rest position by means of the respective coils. Besides providing charge or current for the deflection of the pins, this measure has two further effects which make it possible for a high printing speed to be achieved with simple means. The current resulting from the movement of the pins from the print position into the rest position is converted to a smaller extent into heat, so that an excessive heating can be avoided more easily. Moreover, the pins can return faster into their rest position due to the fast decay of the current in the coils. This embodiment of the apparatus and of the method has the further advantage that the only very short-term peak currents occurring upon printing do not need to be provided or only to a reduced amount by a power unit, so that this can be of a smaller size.

In principle, the supply unit can be of any structure and preferably formed as a DC voltage source. Preferably, it is configured in such a way that it provides a substantially constant output voltage. A substantially constant output voltage here is understood to mean in particular that the output voltage, which is fed to the circuit, varies less than 5% even upon the activation of the print head and a corresponding current consumption. In this way, to the coils of the pins there can be supplied very reproducibly defined pulses.

Depending on the quantity of the maximum current, such a supply unit may have a relatively elaborate structure. Preferably, the supply unit has a charging device connected with an input of the supply unit, a chargeable element, preferably a capacitor, connected with the charging device, and a down converter connected with the chargeable element, which provides the substantially constant output voltage, wherein the charging device, preferably while limiting the current at the input of the supply unit, charges the chargeable element to a predetermined charging voltage which is greater than the output voltage to be provided by the supply unit, and the down converter discharges the chargeable element in order to provide at the output of the supply unit current at the constant output voltage. In the method, accordingly, preferably for providing current for the print head at a predetermined output voltage, first there can be charged a chargeable element with current at a predetermined input voltage to a charging voltage which is greater than the output voltage, and for providing the current be at least partly discharged, in order to provide current at the constant output voltage. This form of the supply unit, in particular the charging to the high, compared to the output voltage, charging voltage, has the advantage, compared to a conventional voltage regulation by RC modules, that very soon the charge stored in the chargeable element of the supply unit can be made available as output current and the chargeable element can have a lower capacity. This embodiment has the further advantages that the supply unit can be arranged near the print head at a distance from a power unit supplying it, and that for charging the chargeable element there are necessary only relatively small currents. The actual power unit therefore, despite high peak currents at the output of the supply unit during printing, can be designed to be relatively small.

This type of supply unit is also advantageous independently of the type of circuit. Object of the present invention is therefore also an apparatus for printing a banding strip, in particular a banding strip for documents of value, having a pin print head which comprises a predetermined number of pins movable between a print position and a rest position and for each of the pins a respective coil for movement thereof from the rest position into the print position and a respective return element for movement thereof from the print position back into the rest position, a circuit actuatable by print signals, which, in response to print signals, activates the print head in accordance with the print signals, in order to print patterns specified by the print signals, and a supply unit for providing current for the circuit and by means thereof for the coils, which has a charging device connected with an input of the supply unit, a chargeable element, preferably a capacitor, connected with the charging device, and a down converter connected with the chargeable element, which provides the substantially constant output voltage, wherein the charging device, preferably while limiting the current at the input of the supply unit, charges the chargeable element to a predetermined charging voltage which is greater than the output voltage to be provided by the supply unit, and the down converter discharges the chargeable element in order to provide at the output of the supply unit current at the constant output voltage.

Preferably, the charging device comprises an up converter which converts an input voltage present at the input of the supply unit to the charging voltage and charges the chargeable element to the charging voltage which is greater than the input voltage. In this way, for the supply of the charging device there can be used a power unit which does not need to provide the high charging voltage.

Preferably, the charging voltage is at least 30% greater than the input and the output voltage.

For the actuation of the individual pins there is used the circuit which for this purpose can have in principle any means. According to a preferred embodiment, the circuit can have for each of the coils two pin switching devices actuatable in dependence on the print signals, between which the respective coil is connected forming a series circuit, and the circuit can further be configured such that in a closed state of the pin switching devices, the respective coil is connected with the supply unit such that at the respective coil the first voltage is present, but in the open state is not. In the open state, at the respective coil can be present in particular the second voltage. The pin switching devices can have any form, but the form of an electronic switching device is preferred. In the series circuit, in which the coil is arranged between the pin switching devices, there can be present further components or branches. Upon closing the pin switching devices for a coil, through this thus flows, because of the first voltage at least indirectly provided by the supply unit, a current which builds up a magnetic field moving the pin. Upon opening at least one of the pin switching devices, preferably both pin switching devices, the first voltage, however, is no longer present at the coil.

In principle, upon an activation of the print head, the pins can be actuated individually in parallel or one after the other and/or independently of each another. However, it is preferred that the circuit has for at least two predetermined groups of the coils a respective group switching device actuatable in dependence on the print signals and for each of the coils of the groups a respective pin switching device actuatable in dependence on the print signals, so that each of the coils of the groups is connected in series between the respective group switching device and the respective pin switching device, and that the circuit is configured such that in a closed state of the group switching device and of the pin switching device the respective coil is connected with the supply unit such that at the respective coil the first voltage is present, but in an open state is not. Upon closing the group switching device and the pin switching device for a coil, through this coil thus flows, because of the first voltage at least indirectly provided by the supply unit, a current which builds up a magnetic field moving the pin. Upon opening the group switching device or the pin switching device, preferably both devices, the first voltage, however, is no longer present at the coil. This dividing into groups has the advantage, that the actuation can be considerably simplified. In particular, groups can be actuated in parallel or one after the other. As group switching devices there are preferably also used electronic switching devices. A current flow from the supply unit here is understood to mean a current which comes from the supply unit, or is formed by the first voltage provided by this. If the circuit has the group switching devices, then preferably the group switching device of one of the groups may be connected, by means of the corresponding coils of the group, with the respective pin switching devices associated to the coils.

So that only in the closed position of the pin switching devices or of the group switching device and the pin switching device the first voltage is present at the coil, the circuit must be configured accordingly. For applying the second voltage to the coils, the circuit may have preferably for at least one, preferably for each of the coils a circuit branch which contains the coil and which is connected to the output of the supply unit and, if any, the rechargeable element such that upon opened pin switching devices the second voltage provided preferably by means of the supply unit and, if any, the rechargeable element is applied to the coils.

For the decay of the current upon the application of the second voltage, the circuit can be configured in principle in any suitable way. Preferably, in the circuit, however, at least one of the circuit branches, preferably each of the circuit branches has at least one current blocking device, which upon the application of the second voltage allows a current flow through the circuit branch from the coil to the supply unit and/or the rechargeable element against the second voltage, upon the application of the first voltage, however, does substantially not allow a current flow through the circuit branch from the supply unit to the coil. As a current blocking device there can be used in particular a passive component, preferably a diode. But it is also possible to use active components or current blocking devices.

Particularly preferably, the at least one current blocking device or the current blocking devices in the respective circuit branch is or are connected in series with the respective coil between two terminals of the rechargeable element and the supply unit, respectively, and the circuit has preferably at least one further current blocking device, which forms with the at least one current blocking device and the respective coil a series circuit in which particularly preferably the coil is arranged between the current blocking device and the further current blocking device, the series circuit being connected with the supply unit such that after opening of at least the pin switching devices or the pin switching device and of the group switching device, at the coil there is present the second voltage. This embodiment is characterized by a simple structure.

A particularly simple structure, in particular when group switching devices are used, can result from at least two of the coils, preferably all the coils of one of the groups or all coils, being connected with the same further current blocking device. The circuit branches having the current blocking devices then have a common section which has the further current blocking device.

Object of the invention is further a banding apparatus for stacks of documents of value having a feed device for bands in reel form and a strapping device which straps a stack of documents of value with a band fed by the feed device, and a band printing apparatus according to the invention arranged between the feed device and the strapping device. As strapping devices there can be used in particular the strapping devices as described in DE 28 35 308 A1 and in DE 102 25 705 A1.

As already explained, the banding apparatus can preferably be used in continuous operation for banding stacks which are formed by an apparatus for processing documents of value. An object of the invention is therefore also an apparatus for processing documents of value, which includes an input for receiving documents of value to be processed, at least one storage device for storing processed documents of value as a stack, which has a moving device for moving a stored stack into a predetermined position, a transport device for transporting singled documents of value from the input to the storage device along a transport path, a checking device arranged at the transport path for checking documents of value transported along the transport path according to predetermined criteria and giving check signals representing a result of the check, a banding apparatus according to the invention, a control device which is configured to actuate the transport device in dependence on check signals of the checking device and to actuate the banding apparatus, wherein the control device, when the stack has reached a predetermined number of documents of value, actuates the banding apparatus in such a way that a band to be used for strapping the stack is printed with a pattern formed in dependence on the check signals or another property of the stack and the stack is strapped with said band.

In the following the invention is still further explained by way of example with reference to the Figures.

Figure 2:
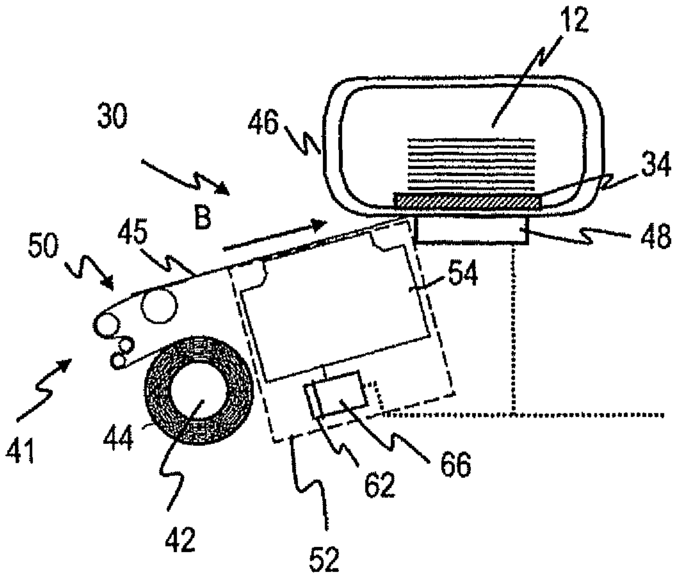
Figure 3:
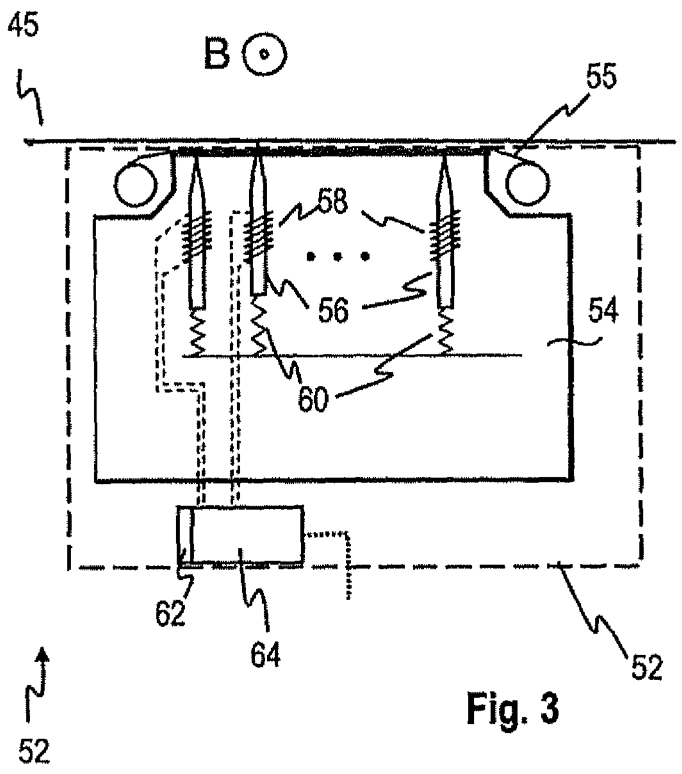
Figure 4:
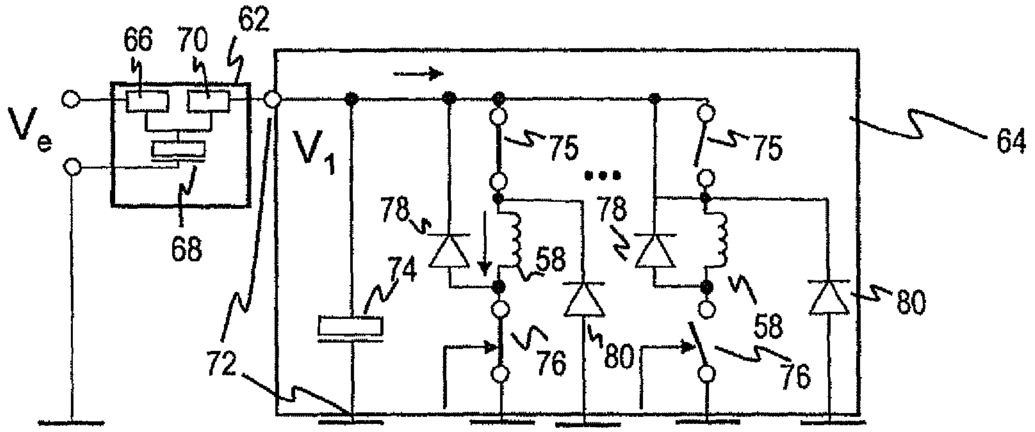
Figure 5:
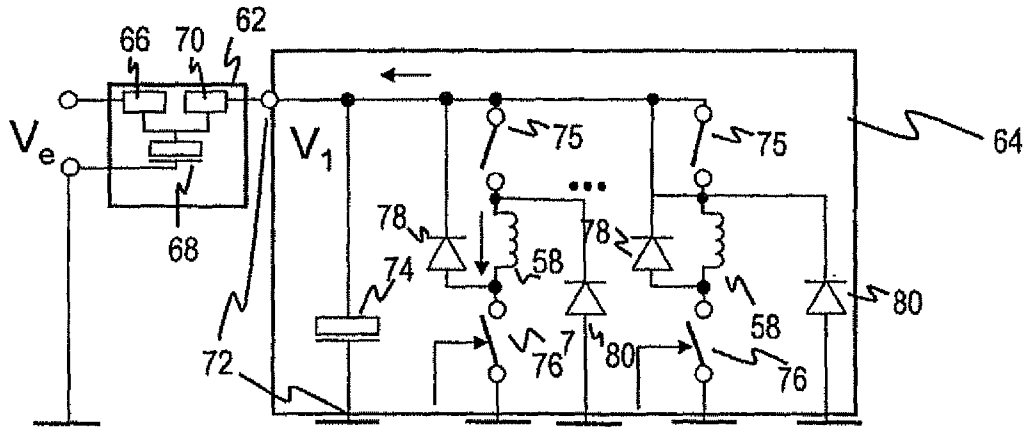
Figure 6:
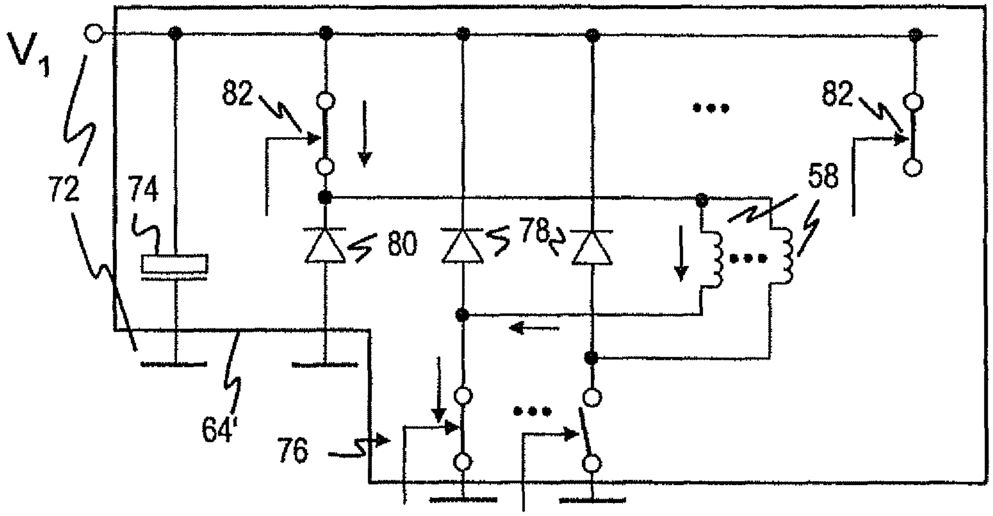
Figure 7:
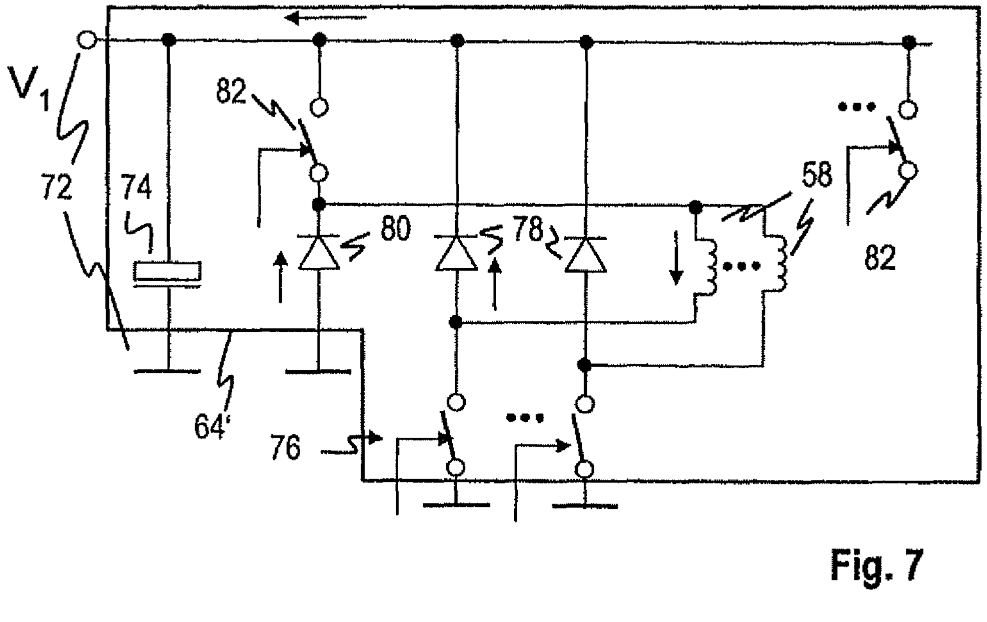
Figure 8:
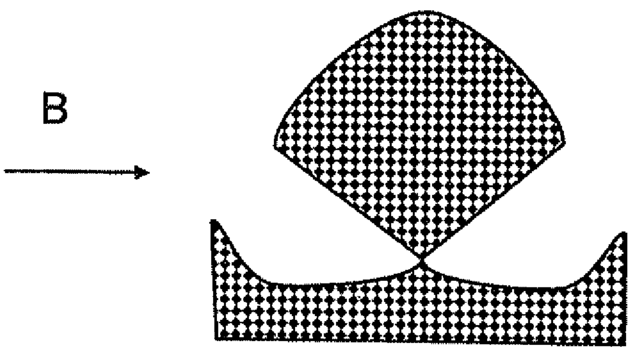
Figure 9:
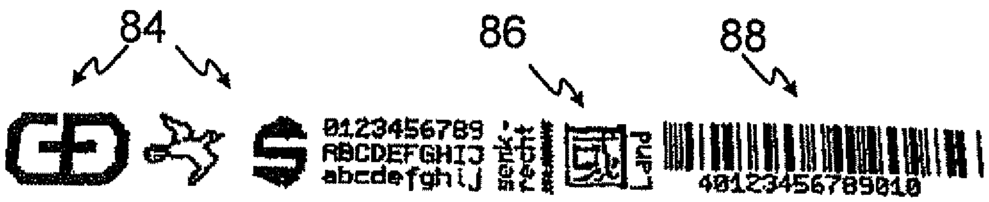

FIG. 1 shows a schematic view of a bank note processing apparatus having several banding apparatuses, FIG. 2 shows a schematic partial view of one of the banding apparatuses in FIG. 1, FIG. 3 shows a schematic view of a portion of the banding apparatus in FIG. 2 having an apparatus for printing bands against the transport direction B of a banding strip, FIG. 4 shows a first embodiment example of a supply unit and a circuit for actuating coils of the band printing apparatus in FIG. 3 during a printing operation, FIG. 5 shows the circuit in FIG. 4 after the end of the printing operation, FIG. 6 shows a second embodiment example of a supply unit and a circuit for actuating coils of the band printing apparatus, in which there is shown only a part of the circuit actuating a pin group, during a printing operation, FIG. 7 shows the circuit in FIG. 6 after the end of the printing operation, FIG. 8 shows an example of a graphic pattern, and FIG. 9 shows an example of a band print with various graphic elements as well as letters and numbers.

An apparatus 10 for the processing of documents of value 12, in the example the sorting of bank notes, in FIG. 1 has an input or input unit 14, which integrates an input pocket 16 for receiving a stack of documents of value 12 to be processed and a singler 18 for singling the documents of value 12 of the stack and dispensing them as singled documents of value, an output or output unit 20 with at least two, in the example five, storage pockets 22 for storing processed documents of value 12 and a transport device 24 for transporting singled documents of value 12 along a transport path 26 from the input unit 14 to the output unit 20. The transport device 24 has diverters 28, through which there are formed branches of the transport path 26 to the storage pockets 22. At the end of the branches there are arranged spiral slot stackers in each case, not shown in the Figures, which store the documents of value in the storage pockets 22. Before at least one of the storage pockets 22, in the example the first four storage pockets, there is arranged a banding apparatus 30 in each case, to each of which can be fed documents of value 12 stacked on a carrier 34 of the respective storage pocket 22 for banding, which carrier 34 is movable by a drive 32 shown only schematically.

On the transport path 26, there are arranged a first checking device 36 and a second checking device 38, which detect for example in a known way in particular physical, properties, for example the printed image and/or luminescence properties of documents of value 12 transported past said checking devices in a singled fashion, and generate signals in dependence on the detected properties based on predetermined criteria for the type, in particular the denomination, and/or the authenticity and/or the condition of the documents of value, which signals reflect or represent the type or the authenticity or the condition of the document of value checked in each case. A control device 40 is connected via signal connections, among other things, with the checking devices 36 and 38, the transport device 26, the drives 32 of the carriers 34 of the storage pockets 22 and the respective banding apparatuses 30 and actuates, among other things, in dependence on the signals of the checking devices 36 and 38 the transport device 24, in particular the diverters 28, the drives 32 and the banding apparatuses 30 in such a way that the documents of value are stored in accordance with the results of the check and maybe further criteria in appropriate storage pockets 22 and transported in dependence on predetermined criteria, for example the number of documents of value stacked in the respective storage pocket 22, as a stack on the respective carrier 34 by the associated drive 32 into the respective banding apparatus 30 and are banded therein. The control device 40 has a user interface, not shown in the Figures, for the input and output of data relating to the operation of the apparatus. The user interface may have, for example, a display device and a keyboard and/or a pointing device, for example a mouse.

The banding apparatuses 30 are formed in the same way so that it is sufficient to describe only one in more detail. As shown very schematically in FIG. 2, the banding apparatus 30 has a feed device 41 for banding strips with a retainer 42 for a band reel 44 with a wound-up banding strip 45, a guide device 46 which guides an end of the banding strip 45 inserted into it around a stack of documents of value 12 located in the guide device 46, and a combined cutting and connecting device 48 which seizes the end of the banding strip 45 guided around the stack, cuts off a portion of the banding strip 45 coming from the band reel while forming a band, and connects with each other the ends of the cut-off banding strip or of the band guided around the stack, for example, depending on the band material, glues or welds them. The banding apparatus 30 further has a transport device 50 of the feed device with rollers for the transport of the band material of the band reel 44 from this to the guide device 46. For printing the bands immediately before the banding, there is provided a band printing apparatus 52. The banding apparatus 30 can in particular be formed, except for the band printing apparatus 52 and a corresponding adjustment of the transport speeds for the banding strip, as in DE 10225705 A1, whose content is hereby incorporated by reference into the description.

The feed device 41, the band printing apparatus 52 and the cutting and connecting device 48 are connected via signal connections to the control device 40, which actuates the band printing apparatus 52 and the cutting and connecting device 48.

Upon the processing of documents of value, a stack of documents of value collected in one of the storage pockets 22 is fed, as already noted, in response to corresponding signals of the control device 40, to banding, when the stack meets a predetermined criterion, for example a predetermined number of documents of value. The processing of documents of value not yet processed is preferably not interrupted thereby, but continued. The banding apparatus 30 then bands, in response to corresponding signals of the control device 40, the stack fed to it, whereupon this stack is fed to a stack storage not shown in the Figures. As soon as in the corresponding storage pocket 22 there is again a stack of collected documents of value, the process is repeated. Since the apparatus for processing documents of value 10 processes documents of value preferably with a processing speed of more than 35 bank notes/s, preferably more than 40 bank notes/s, the banding is effected sufficiently fast so as to make possible an operation as interruption-free as possible.

The band printing apparatus 52 is schematically shown in more detail in FIG. 3, together with other, already described parts of the banding apparatus 30. It has a print head, by which, upon an activation, there can be printed more than nine, in particular more than eighteen dots, in the example a pin print head 54 which comprises a predetermined number of more than nine, in the example twenty-eight pins 56 movable between a print position and a rest position, arranged along a line, in the example a straight line transverse to the transport direction B of the banding strip 45, and for each of the pins 56 a respective coil 58 for movement thereof from the rest position into the print position and a respective return element 60, for example a spring, for movement thereof from the print position back into the rest position. Between the pin print head 54 and the banding strip 45 there is arranged an ink ribbon 55 moved by means of an ink ribbon drive, not shown in the Figures, preferably before, during or after the printing. The pin print head 54 is shown only schematically, as a pin print head 54 there can be used any suitable pin print head in which the pins are moved by means of a coil. In the following, only one example is described schematically. The rest position is schematically shown in FIG. 3 for the left pin. In this position, the return element 60 is unbent or exerts a slight bias or force in a direction parallel to the longitudinal axis of the pin in the direction away from the banding strip 45. In order to print a dot, to the coil 58 of the respective pin 56 there is fed a current pulse which entails that a magnetic field is built up in the coil 58. This can act upon an armature of the pin 56, for example a soft magnetic section of the pin 56, and move the pin 56 under deflection of the return element 60 in the direction of the ink ribbon and of the banding strip 45. The pin 56 then presses in the print position in a known manner the ink ribbon 55 onto the banding strip, printing a dot. This position is shown schematically in FIG. 3 for the second pin from the left. After the end of the current pulse the bent return element 60 pulls the pin back into the rest position. In the respective coil thus the result is a current, in case a closed electric circuit is present.

For supplying the pin print head 54 with current or for actuating the pins 56, the band printing apparatus 52 has a supply unit 62 for providing current to be fed to the coils 58, and a circuit 64 actuatable by print signals of the control device 40 and comprising the coils 58, by means of which the current can be fed to the coils, and which, in response to print signals, activates the print head 46 in accordance with the print signals, in order to print patterns specified by the print signals. The circuit 64 is in particular adapted to apply, in dependence on a print signal, to coils 58 specified by the print signal a first voltage generated by the supply unit, so that to these coils current is fed in each case for the movement of the corresponding pins 56 into the print position, and to thereafter cut off the first voltage from the respective coil, thereby the pins 56 being able to return into the rest position. For supplying the print signals, the circuit 64 is connected via a signal connection with the control device 40.

An activation of the pin print head 54 is understood to mean in particular that its pins 56, insofar as to be actuated in accordance with the print signals, are actuated substantially simultaneously or within a time interval which is smaller than the period between successive actuations of the same pin.

The pin print head 54, the supply unit 62 and the circuit 64 are in particular configured to print onto the banding strip 45, in response to corresponding print signals, patterns, in particular also graphic patterns, onto the banding strip 45 guided past the pin print head 54. Preferably, the pin print head 54, the supply unit 62 and the circuit 64 are configured such that the print head 46 can be activated with a frequency of more than 0.5 kHz, preferably more than 1 kHz. In the example, in particular a frequency of 1.2 kHz can be achieved.

The supply unit 62 is formed as a DC voltage source and insofar as a constant voltage source, as it provides for the printing process a substantially constant, in particular except for fluctuations of less than 5% percent, output voltage V1, which serves to supply the circuit 64. The supply unit 62 thus has a charging device in the form of an up converter 66, a capacitor 68 connected with the charging device, i.e. here the up converter 66, as a chargeable element and a down converter 70 connected with the capacitor 68, which provides the constant output voltage V1. The up converter 66, to which is fed an input voltage VE, charges the capacitor 68, preferably while limiting the current to a predetermined value, for example predetermined by the maximum current of the current supply of the supply unit 62, to a predetermined charging voltage VL which is greater than the input voltage VE and the output voltage V1. The down converter 70 can discharge the capacitor 68, in order to provide the constant output voltage V1 at the down converter 70 even in the case of increased current consumption. Since the charging voltage VL is higher than the output voltage V1, preferably more than one and half times the size of the output voltage, upon the discharging of the chargeable element 68 there can be provided for a short term, at a given capacity of the element, a current greater than upon the use of RC modules in which capacitors are charged to the output voltage.

With the outputs of the supply unit 62 there is connected an input 72 of the circuit 64. In parallel to the outputs of the supply unit 62 and thus in parallel to the inputs of the circuit 64 there is arranged a rechargeable element 74, in the example a capacitor, preferably an electrolytic capacitor.

The circuit 64 is now configured such that it connects, in dependence on a print signal, coils 58 specified by the print signal to the supply unit 62, so that to these coils there is applied a first voltage generated by means of the supply unit 62, in the example substantially the output voltage of the supply unit 62, and so to these coils, under at least partial discharge of the rechargeable element 74, current is fed in each case for building up a magnetic field and thus for moving the corresponding pins 56 into the print position. The first voltage is applied to the respective coils 58 for a period of time so long that the associated pins 56 can reach their print positions. This length of time can in principle be controlled by the circuit, but it is also possible that it is specified, as in this embodiment example, by the print signals. The circuit is further configured such that it then applies to the respective coils a second voltage which is opposite to the first voltage. In this way, on the one hand, the magnetic field of the coil can decay very quickly, so that the respective return element 60 can also move the pin 56 quickly into the rest position. In case of an only slow decay of the magnetic field, the movement into the rest position would be effected slower. On the other hand, the rechargeable element 74 can be charged by the current which is generated upon the movement of pins 56 moved into the print positions back into the rest positions by means of the respective coils 58. This has two effects: First, the charge is ready to provide current for the next movement of pins, which reduces the demands on the voltage stability of the supply unit 62. Second, the current can decay faster upon the application of the second voltage.

An example for the circuit 64 is shown in more detail in the FIGS. 4 and 5. In this circuit, for each of the pins 56 and each of the coils 58 moving these, there are provided two pin switching devices 75 and 76, only schematically shown in the Figures, hereinafter for simplicity's sake referred to as pin switch which is actually formed as an electronic switch and actuated by corresponding print signals which are supplied to it by the control device 40. In the example, the pin switching devices 75 and 76 together with the coil 58 form a series circuit, in which the coil 58 is arranged between the pin switches and which is connected between the outputs of the supply unit 62 and the terminals of the rechargeable element 74, so that by closing and opening the pin switches 75 and 76, the coil 58 can be connected with the supply unit 62 in such a way that the first voltage is present at this coil, and can be separated from it, so that the first voltage is no longer applied. The pin switches 75 and 76 in a closed state make possible a current flow corresponding to the first voltage from the supply unit 62 through the respective coil 58, but in an open state, however, separate the coil from the first voltage.

So as to apply the second voltage to the coils, the circuit 64 has for each of the coils 58 a circuit branch which on the one hand is connected with the supply unit 62 and the rechargeable element 74 in such a way that, upon opened pin switching devices 75 and 76, the second voltage, in the example also provided by means of the supply unit 62 and, if any, the rechargeable element 74, is present at the coil 58, which second voltage has a, compared to the first voltage, reverse direction or a reverse sign.

In particular, the circuit 64 has in each of the branches, which comprise one of the coils in each case, at least one current blocking device 78, in the example a diode, which allows a current flow from the respective coil 58 to the rechargeable element 74, but not from the supply unit 62 to the coil 58. In the example, thus the current blocking devices 78 are connected in series with the respective coil 58 between two terminals of the rechargeable element 74 and of the supply unit 62, respectively. So as to make possible a current flow from the coils 58 to the rechargeable element 74, the circuit 64 has in each branch a further current blocking device 80, which forms with the current blocking devices 78 and the respective coils 58 a series circuit in each case, in which the coils 58 are arranged between the corresponding current blocking devices 78 and the further current blocking device 80.

The circuit 64 works as follows:

For printing (see FIG. 4), the pin switches 75 and 76 are, in dependence on the print signal, closed or remain in the open starting position. After that, a current provided by the supply unit 62 and the rechargeable element 74 can flow through the closed pin switches 76 and the coils 58 connected in series therewith. In FIG. 4, the current flow is indicated by arrows. The current-carrying coils then generate a magnetic field, which moves the pins 56 into the print position.

By opening all the pin switches 75 and 76 in dependence on the print signal, the coils are separated from the output voltage of the supply unit 62 and thus the current supply through these, i.e. the current pulse used for printing, is terminated (see FIG. 5).

The magnetic field generated by the previously energized coils 58 now decays, whereby the armatures of the pins 56, which are moved by the return elements 60 into the rest position, are moved in the coils 58. The current thus generated, in FIG. 5 indicated by arrows, can now flow in the respective series circuit of current blocking device 78, coil 58 and the further current blocking device 80 to the rechargeable element 74 and charge this.

By the opening of the pin switching devices 75 and 76, now at the respective branch having the series circuit comprising the current blocking device 78, the coil 58 and the further current blocking device 80, there is present the reverse output voltage of the supply unit 62 and thus at the coil 58 a second voltage opposite to the first voltage. Since the current, which results from the decay of the magnetic field, runs against this voltage, the energy stored in the magnetic field decays very quickly.

This process thus has the further effect, besides the charging of the rechargeable element 74, that the magnetic fields in the previously energized coils can decay rapidly, so that the time for the return into the rest position can be reduced and correspondingly the printing frequency be increased.

Starting out from this state, a following print signal can trigger the above described printing of another character or pattern.

Since the pins can be individually arbitrarily actuated, upon a corresponding actuation by a print signal thus also the print of graphic patterns is possible. In particular, the control device can emit the print signals, in response to which there are printed the patterns which do not contain or not only contain numbers or letters of the Latin alphabet, or merely a combination of these, but have for example Asian or Arabic characters as well as other symbols or logos and in particular also bar codes. These may reproduce in particular information about the processing of the bank notes, for example a name of the organization carrying out the processing or the date of the processing, and/or the owner of the stack. An example of a logo is schematically shown in FIG. 8. A rhombus symbolizes a printed dot here.

It has transverse to the transport direction B a dot density of more than 2 dots/mm, preferably more than 3 dots/mm.

A further example of a pattern with graphic and non-graphic components in FIG. 9 comprises, among other things, a logo 84 of the owner of the stack, a Chinese character 86 and a bar code 88 which can contain data in coded form for the processing of the stack. The shown pattern is produced with a print head which has pins along a straight line transverse to the transport direction of the banding strip 28.

A second embodiment example differs from the first embodiment example only in that the circuit 64 is replaced by a circuit 64' illustrated in FIG. 6 and FIG. 7. Otherwise, the embodiment example is unchanged compared to the first embodiment example, so that for the same parts the same reference signs are used and the explanations there apply here, too.

The circuit 64' differs from the circuit 64 substantially in that the pins are now actuated in groups. Accordingly, here, too, for the same parts the same reference signs are used and the explanations there apply here, too.

The circuit 64' has several group switching devices 82, in this embodiment example formed analogous to the pin switches 76, each of which is associated to a group of predetermined pins 56 or corresponding coils 58, and which can be actuated in dependence on the print signals. They replace the pin switching devices 75 for the coils of the respective groups in the circuit 64, but have an analogous function. For clarity's sake, in the FIGS. 6 and 7 there is shown in each case only one of the coil groups and one of the corresponding group switching devices 82.

In this embodiment example, the pin switches 76, the coils 58 and the current blocking devices 78 are arranged or connected relative to each other and to one of the terminals of the rechargeable element 74 in the same way as in the first embodiment example.

Unlike the first embodiment example, now between a terminal of the supply unit 62 and of the rechargeable element 74 connected in parallel the supply unit's outputs and the coils 58 of the respective group there are connected the group switching devices 82. The respective group switching devices 82 thus are each connected with first terminals of the coils 58 of the respective group and second terminals of the coil 58 different from the first terminals with the pin switches 76. The group switching devices 82 thus each form with the coils of their group and the pin switches connected with the coils parallel series circuits, which are connected with the inputs of the circuit 64', i.e. the outputs of the supply unit 62 and the terminals of the rechargeable element 74.

So as to make possible a current flow from the coils 58 to the rechargeable element 74, the circuit 64 has for each of the groups a common further current blocking device 80 in each branch, which forms with the respective current blocking devices 78 and the respective coils 58 a series circuit in each case in which the coils 58 are arranged between the corresponding current blocking devices 78 and the further current blocking device 80. The branches thus have in this embodiment example a common section in which the individual further current blocking device 80 for the group is arranged.

The method of operation of this circuit 64' differs from that of the circuit 64 only in that for the actuation of the coils, both the group switching devices 82 and the pin switches 76 are actuated by print signals. A current flow through a coil 58 for moving the corresponding pin into the print position is only effected when at the same time the corresponding group switching device 82 and the corresponding pin switch 76 are closed.

At the end of a pulse, both the closed group switching device 82 and the closed pin switches 76 of the group are opened, so that the coils 58 of the group are separated from the supply unit 62.

In other embodiment examples, instead of the described banding apparatus, there can also be used a banding apparatus corresponding to the teaching of the DE 28 35 308 A1, whose content is hereby incorporated by reference into the description, in which, however, one of the described band printing apparatuses is used.

The invention claimed:

1. An apparatus for printing a banding strip for documents of value comprising:

a print head capable of printing more than nine dots;

a circuit actuatable by print signals which, in response to the print signals, is arranged to activate the print head in accordance with the print signals to thereby print patterns specified by the print signals; and a current supply unit that supplies current for the circuit and the print head, wherein the print head comprises a pin print head which comprises a predetermined number of more than nine pins movable between a print position and a rest position and for each of the pins a respective coil for movement thereof from the rest position into the print position and a respective return element for movement thereof from the print position back into the rest position; and the circuit comprises the coils, and the circuit is arranged to apply to coils specified by the print signal, in dependence on a print signal, a first voltage generated by the current supply unit, so that current is fed respectively to said coils for moving the corresponding pins into the print position, and thereafter to apply to the coils specified by the print signal a second voltage which is opposite to the first voltage; and wherein the circuit has, in parallel to its input, and which is connected with the current supply unit, at least one rechargeable element which, upon receiving a first voltage, is at least partially discharged to feed current to the coils, and upon receiving an applied second voltage, is at least partially charged by the current which is generated upon the movement of pins being moved into the print position back into the rest position by means of the respective coils.

2. The apparatus according to claim 1, wherein the circuit is configured such that in response to corresponding print signals the patterns comprise graphic patterns.

3. The apparatus according to claim 1, wherein the print head, the current supply unit and the circuit are configured such that the print head can be activated with a frequency of more than 0.5 kHz.

4. The band printing apparatus according to claim 1, wherein the current supply unit is configured such that it provides a substantially constant output voltage.

5. The band printing apparatus according to claim 1, wherein the supply unit has a charging device connected with an input of the current supply unit, a chargeable element, connected with the charging device, and a down converter connected with the chargeable element, which provides the substantially constant output voltage, wherein the charging device charges the chargeable element to a predetermined charging voltage which is greater than the output voltage to be provided by the supply unit, and the down converter discharges the chargeable element in order to provide at the output of the supply unit current at the constant output voltage.

6. The band printing apparatus according to claim 1, wherein the circuit has for each of the coils two pin switching devices actuatable in dependence on the print signals, between which the respective coil is connected forming a series circuit, and wherein the circuit is further configured such that in a closed state of the pin switching devices the respective coil is connected with the supply unit such that at the respective coil the first voltage is present, but is not in an open state.

7. The band printing apparatus according to claim 1, wherein the circuit has for at least two predetermined groups of the coils a respective group switching device actuatable in dependence on the print signals and for each of the coils of the groups a respective pin switching device actuatable in dependence on the print signals, so that each of the coils of the groups is connected in series between the respective group switching device and the respective pin switching device, and wherein the circuit is configured such that in a closed state of the group switching device and of the pin switching device the respective coil is connected with the supply unit such that at the respective coil the first voltage is present, but is not in an open state.

8. The band printing apparatus according to claim 1, wherein the circuit has for at least one coil a circuit branch which includes the coil and is connected with the supply unit such that upon opened pin switching devices the second voltage provided is applied to the coils.

9. The band printing apparatus according to claim 8, wherein at least one circuit branch includes at least one current blocking device, which upon the application of the second voltage allows a current flow through the circuit branch from the coil to the supply unit, upon the application of the first voltage, but prevents a current flow through the circuit branch from the supply unit to the coil.

10. The band printing apparatus according to claim 9, wherein the at least one current blocking device or the current blocking devices in the respective circuit branch is or are connected in series with the respective coil between two terminals of the rechargeable element and the supply unit, respectively, and wherein the circuit has preferably at least one further current blocking device, which forms with the at least one current blocking device and the respective coil a series circuit, the series circuit being connected with the supply unit such that after the opening of. at least the pin switching devices or of the pin switching device and of the group switching device, there is present at the coil the second voltage.

11. The band printing apparatus according to claim 10, wherein at least two of the coils are connected with the same further current blocking device.

12. A banding apparatus for stacks of documents of value, the banding apparatus comprising:

a feed device for bands in reel form;

a strapping device which straps a stack of documents of value with a band fed by the feed device; and a band printing apparatus arranged between the feed device and the strapping device, wherein the band printing includes a print head capable of printing more than nine dots, a circuit actuatable by print signals which, in response to the print signals, is arranged to activate the print head in accordance with the print signals to thereby print patterns specified by the print signals, and a current supply unit that supplies current for the circuit and the print head, wherein the print head comprises a pin print head which comprises a predetermined number of more than nine pins movable between a print position and a rest position and for each of the pins a respective coil for movement thereof from the rest position into the print position and a respective return element for movement thereof from the print position back into the rest position;

the circuit comprises the coils, and the circuit is arranged to apply to coils specified by the print signal, in dependence on a print signal, a first voltage generated by the current supply unit, so that current is fed respectively to said coils for moving the corresponding pins into the print position, and thereafter to apply to the coils specified by the print signal a second voltage which is opposite to the first voltage; and wherein the circuit has, in parallel to its input, and which is connected with the current supply unit, at least one rechargeable element which, upon receiving a first voltage, is at least partially discharged to feed current to the coils, and upon receiving an applied second voltage, is at least partially charged by the current which is generated upon the movement of pins being moved into the print position back into the rest position by means of the respective coils.

13. An apparatus for processing documents of value, comprising:

an input for receiving documents of value to be processed:

at least one storage device arranged to store processed documents of value as a stack, and which has a moving device arranged to move a stored stack into a predetermined position;

a transport device arranged to transport singled documents of value from the input to the storage device along a transport path;

a checking device along the transport path arranged to check documents of value transported along the transport path according to predetermined criteria and giving check signals representing a result of the check;

a banding apparatus; and a control device configured to actuate the transport device in dependence on check signals of the checking device and to actuate the banding apparatus, wherein the control device, when the stack has reached a predetermined number of documents of value, is arranged to actuate the banding apparatus in such a way that a band to be used for strapping the stack is printed with a pattern formed in dependence on the check signals or another property of the stack and to strap the stack with said band, wherein the banding apparatus includes:

a feed device for bands in reel form, a strapping device which straps a stack of documents of value with a band fed by the feed device, and a band printing apparatus arranged between the feed device and the strapping device, and wherein the band printing includes:

a print head capable of printing more than nine dots, a circuit actuatable by print signals which, in response to the print signals, is arranged to activate the print head in accordance with the print signals to thereby print patterns specified by the print signals, and a current supply unit that supplies current for the circuit and the print head.

14. A method for printing a banding strip, comprising the steps:

generating print signals enabling printing of a predetermined pattern; and activating the print head several times in succession, in dependence on the print signals, to print the pattern, wherein upon each activation, more than nine dots are printed; and using as a print head a pin print head which comprises a predetermined number of more than nine pins movable between a print position and a rest position and for each of the pins a respective coil for movement thereof from the rest position into the print position and a respective return element for movement thereof from the print position back into the rest position, and for moving the pins in dependence on the print signal, applying a first voltage to coils specified by the print signal, so that current is fed respectively to said coils for moving the corresponding pins into the print position, and thereafter applying a second voltage to the coils specified by the print signal, which is opposite to the first voltage, wherein the circuit has, in parallel to its input, and which is connected with the current supply unit, at least one rechargeable element which, upon receiving a first voltage, is at least partially discharged to feed current to the coils, and upon receiving an applied second voltage, is at least partially charged by the current which is generated upon the movement of pins being moved into the print position back into the rest position by means of the respective coils.

15. The method according to claim 14, wherein as a pattern there are printed graphic patterns.

16. A method for printing a banding strip comprising:

generating print signals for printing a predetermined pattern; and using a pin print head which comprises a predetermined number of pins movable between a print position and a rest position, wherein, for each of the pins a respective coil for movement thereof from the rest position into the print position and a respective return element for movement thereof from the print position back into the rest position are provided, and, which, in response to the print signals, prints patterns onto the banding strip, and wherein for moving the pins, in dependence on the print signal, applying a first voltage to coils specified by the print signal, so that current is fed respectively to said coils for moving the corresponding pins into the print position, and thereafter applying a second voltage to the coils specified by the print signal, which is opposite to the first voltage, wherein the circuit has, in parallel to its input, and which is connected with the current supply unit, at least one rechargeable element which, upon receiving a first voltage, is at least partially discharged to feed current to the coils, and upon receiving an applied second voltage, is at least partially charged by the current which is generated upon the movement of pins being moved into the print position back into the rest position by means of the respective coils.

17. The method according to claim 14, wherein the print head is activated with a frequency of more than 0.5 kHz.

18. The method according to claim 14, wherein, for providing current for the movement of the pins into the print position, using charge from a rechargeable element, and using current resulting from a movement of the pins from the print position into the rest position at least partially for charging the rechargeable element.

19. The method according to claim 14, wherein, for providing current for the print head at a predetermined output voltage, first charging a rechargeable element with current at a predetermined input voltage to a charging voltage, which is greater than the output voltage, and at least partially discharging the rechargeable elements to provide the current at the constant output voltage.

20. The apparatus according to claim 12, wherein the circuit is configured such that in response to corresponding print signals the patterns comprise graphic patterns.

21. The apparatus according to claim 12, wherein the print head, the current supply unit and the circuit are configured such that the print head can be activated with a frequency of more than 0.5 kHz.

22. The apparatus according to claim 12, wherein the print head comprises a pin print head which comprises a predetermined number of more than nine pins movable between a print position and a rest position and for each of the pins a respective coil for movement thereof from the rest position into the print position and a respective return element for movement thereof from the print position back into the rest position; and the circuit comprises the coils, and the circuit is arranged to apply to coils specified by the print signal, in dependence on a print signal, a first voltage generated by the current supply unit, so that current is fed respectively to said coils for moving the corresponding pins into the print position, and thereafter to apply to the coils specified by the print signal a second voltage which is opposite to the first voltage.

23. The band printing apparatus according to claim 12, wherein the current supply unit is configured such that it provides a substantially constant output voltage.

24. The band printing apparatus according to claim 12, wherein the supply unit has a charging device connected with an input of the current supply unit, a chargeable element, connected with the charging device, and a down converter connected with the chargeable element, which provides the substantially constant output voltage, wherein the charging device charges the chargeable element to a predetermined charging voltage which is greater than the output voltage to be provided by the supply unit, and the down converter discharges the chargeable element in order to provide at the output of the supply unit current at the constant output voltage.

25. The apparatus according to claim 13, wherein the circuit is configured such that in response to corresponding print signals the patterns comprise graphic patterns.

26. The apparatus according to claim 13, wherein the print head, the current supply unit and the circuit are configured such that the print head can be activated with a frequency of more than 0.5 kHz.

27. The apparatus according to claim 13, wherein the print head comprises a pin print head which comprises a predetermined number of more than nine pins movable between a print position and a rest position and for each of the pins a respective coil for movement thereof from the rest position into the print position and a respective return element for movement thereof from the print position back into the rest position; and the circuit comprises the coils, and the circuit is arranged to apply to coils specified by the print signal, in dependence on a print signal, a first voltage generated by the current supply unit, so that current is fed respectively to said coils for moving the corresponding pins into the print position, and thereafter to apply to the coils specified by the print signal a second voltage which is opposite to the first voltage.

28. The band printing apparatus according to claim 13, wherein the current supply unit is configured such that it provides a substantially constant output voltage.

29. The band printing apparatus according to claim 13, wherein the supply unit has a charging device connected with an input of the current supply unit, a chargeable element, connected with the charging device, and a down converter connected with the chargeable element, which provides the substantially constant output voltage, wherein the charging device charges the chargeable element to a predetermined charging voltage which is greater than the output voltage to be provided by the supply unit, and the down converter discharges the chargeable element in order to provide at the output of the supply unit current at the constant output voltage.

* * * * *